United States Patent
Randoll et al.

[11] Patent Number: 5,803,608
[45] Date of Patent: Sep. 8, 1998

[54] METHOD FOR GENERATING A SIGNAL RESPONSIVE TO THE INDUCTION AIR TEMPERATURE OF AN INTERNAL COMBUSTION ENGINE

[75] Inventors: Helmut Randoll, Vaihingen, Germany; Andreas Roth, Domont, France

[73] Assignee: Robert Bosch GmbH, Stuttgart, Germany

[21] Appl. No.: 817,394
[22] PCT Filed: Nov. 11, 1995
[86] PCT No.: PCT/DE95/01560
  § 371 Date: Apr. 16, 1997
  § 102(e) Date: Apr. 16, 1997
[87] PCT Pub. No.: WO96/18090
  PCT Pub. Date: Jun. 13, 1996

[30] Foreign Application Priority Data
  Dec. 9, 1994 [DE] Germany .......................... 44 43 812.5

[51] Int. Cl.⁶ ............................ G01K 1/14; G01K 13/02; G01K 3/08
[52] U.S. Cl. .......................... 374/144; 374/112; 374/134; 374/142; 73/118.2
[58] Field of Search .................................... 374/144, 141, 374/134, 126, 112, 142; 123/421, 488, 494; 73/118.2

[56] References Cited

U.S. PATENT DOCUMENTS

| | | | |
|---|---|---|---|
| 3,724,435 | 4/1973 | Bier | 123/482 |
| 3,789,665 | 2/1974 | Hohenberg | 374/144 |
| 3,982,503 | 9/1976 | Keranen | 123/494 |
| 3,990,308 | 11/1976 | McCormick et al. | 374/144 |
| 4,055,997 | 11/1977 | Kniat | 374/144 |
| 4,112,879 | 9/1978 | Assenheimer et al. | 123/494 |
| 4,524,745 | 6/1985 | Tominari et al. | 123/494 |
| 4,719,890 | 1/1988 | Wataya et al. | 73/118.2 |
| 5,343,745 | 9/1994 | Tomisawa | 73/118.2 |
| 5,564,493 | 10/1996 | Kato et al. | 165/263 |
| 5,647,668 | 7/1997 | Schnaibel et al. | 374/144 |

FOREIGN PATENT DOCUMENTS

| | | |
|---|---|---|
| A-2715738 | 11/1977 | Germany . |
| A-2731541 | 2/1979 | Germany . |
| A-4121396 | 1/1993 | Germany . |
| A-4338342 | 5/1995 | Germany . |

*Primary Examiner*—Diego F.F. Gutierrez
*Attorney, Agent, or Firm*—Kenyon & Kenyon

[57] ABSTRACT

A method for generating a signal (TAn) responsive to the induction air temperature of an internal combustion engine. The signal (TAn) for the induction air temperature is determined from a signal (TMot) for the temperature of the internal combustion engine, from a signal (TU) for the ambient temperature, and from a correction factor K. Correction factor K is a function of a signal (mL) and/or a vehicular speed signal (v), signal (mL) representing either the induction air quantity or the air mass of the internal combustion engine. To enable the most accurate possible simulation of induction air temperature, even under changing operating conditions, the signal (TAn) for the induction air temperature is filtered, it being possible to variably select the time constant (ZK) of the filter in response to rising and falling induction air temperatures.

8 Claims, 2 Drawing Sheets

| V \ mL | 10 | 100 | 200 | 300 | 400 | 500 | 600 | [Kg/h] |
|---|---|---|---|---|---|---|---|---|
| 0 | 0,00 | 0,03 | 0,5 | 0,6 | 0,7 | 0,75 | 0,75 | |
| 100 | 0,04 | 0,5 | 0,6 | 0,7 | 0,75 | 0,8 | 0,85 | |
| 200 | 0,65 | 0,7 | 0,75 | 0,8 | 0,9 | 1,0 | 1,0 | |

[Km/h]

5,803,608

METHOD FOR GENERATING A SIGNAL RESPONSIVE TO THE INDUCTION AIR TEMPERATURE OF AN INTERNAL COMBUSTION ENGINE

FIELD OF THE INVENTION

The present invention relates to a method for generating a signal responsive to the induction air temperature of an internal combustion engine.

BACKGROUND INFORMATION

In present-day internal combustion engines, the metered fuel flow is precisely adjusted to the induction air quantity of the internal combustion engine. The air quantity is determined by an appropriate measuring process. In this process, for example, a pressure sensor mounted in the intake tract of the internal combustion takes a pressure measurement and, to determine the air quantity, the thus obtained pressure information is corrected as a function of the induction air temperature to compensate for the temperature dependency of the air density. The induction air temperature is ascertained by a temperature sensor mounted in the intake tract of the internal combustion engine. However, the accuracy of the temperature sensing may be adversely affected when heat produced by high temperatures in the engine compartment radiates to the temperature sensor and its surroundings.

Moreover, the temperature sensor has a certain inertia, so that the accuracy of the temperature sensing may likewise be adversely affected, especially when subjected to rapid temperature changes in the induction air, for example when the vehicle is accelerating. The object of the present invention is to make available a signal which will reproduce the induction air temperature very accurately. Advantageous embodiments of the method according to this following.

SUMMARY OF THE INVENTION

The principal advantage of the present invention is that it enables the induction air temperature of the internal combustion engine to be determined very precisely. In the process of the present invention, a signal is generated for the induction air temperature on the basis of a signal for the temperature of the internal combustion engine and a signal for the ambient temperature. The advantage of this process is that the need has been eliminated for a sensor to detect induction air temperature. Engine-temperature and ambient-temperature sensors are, as a rule, already present anyway.

When the signal is generated for the induction air temperature, a correction factor, which is a function of a signal for the induction air mass or air quantity of the internal combustion engine and of a signal for vehicular speed, is taken into consideration.

It is especially advantageous for the signal for the induction air temperature to be filtered, since this enables the dynamic behavior time response to be simulated very precisely. Different time constants are expediently used for the filtering process when working with rising and falling induction air temperatures.

DETAILED DESCRIPTION

Figures 1, 3:
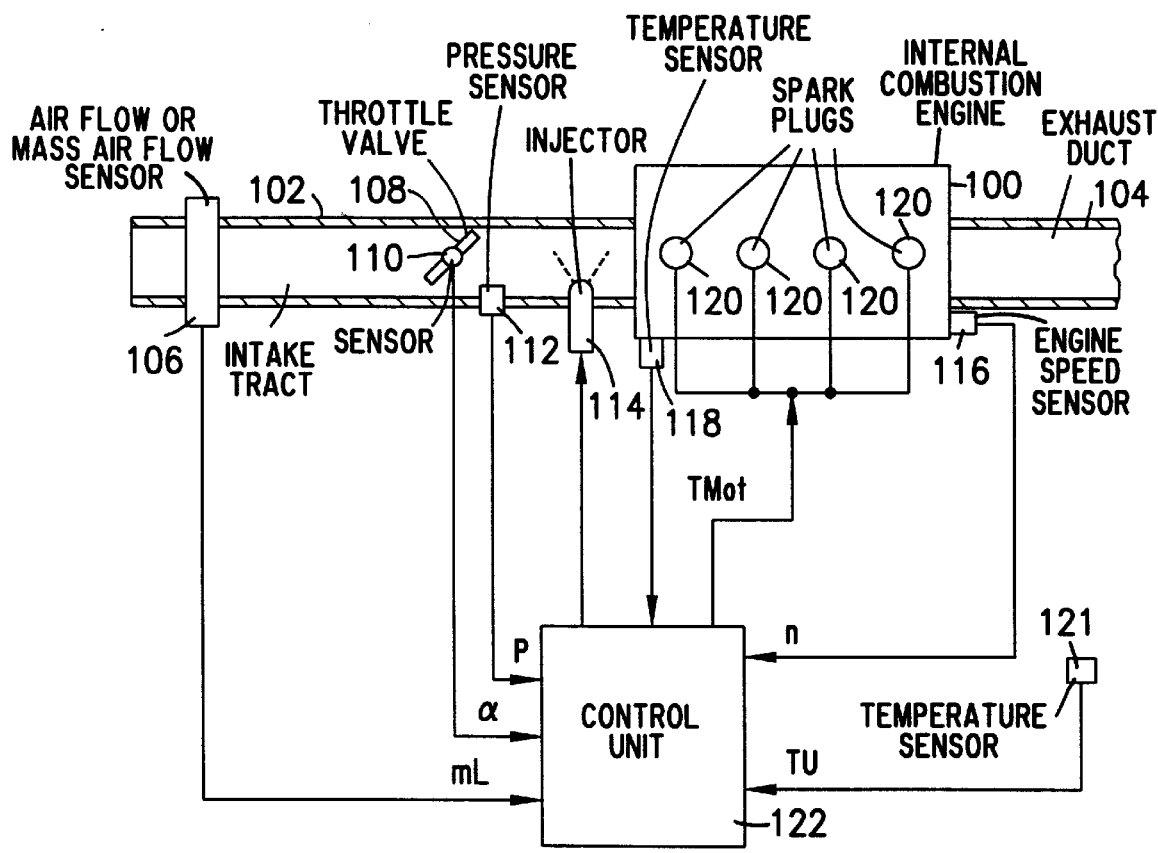
FIG. 1 depicts a basic representation of the technical area where the present invention can be used.
FIG. 3 depicts a table of a characteristics map employed in the method of the present invention.

FIG. 1 shows a schematic representation of the technical area where the invention can be used. An air/fuel mixture is supplied via an intake tract 102 to an internal combustion engine 100, and the exhaust gases are given off into an exhaust duct 104. Arranged in intake tract 102—viewed in the flow direction of the induction air—are an air-flow sensor or mass air-flow sensor 106—for example a hot-film air-mass meter, a throttle valve 108 with a sensor 110 for detecting the opening angle of throttle valve 108, a pressure sensor 112, and at least: one injection nozzle 114. As a rule, either mass air-flow sensor 106 or pressure sensor 112 are alternatively provided. Mounted on internal combustion engine 100 are an engine speed sensor 116 and a temperature sensor 118. In addition, internal combustion engine 100 has, for example, four spark plugs 120 for igniting the air/fuel mixture in the cylinders. A temperature sensor 121 for determining the ambient temperature is mounted at an appropriate location on the motor vehicle, for example in the exterior mirror. The output signals mL from the air-flow sensor or mass air-flow sensor 106, α of sensor 110 for determining the opening angle of throttle valve 108, P of pressure sensor 112 (as a rule, alternatively to signal mL), n of engine speed sensor 116, TMot of temperature sensor 118, and TU of temperature sensor 121 are fed via appropriate connector leads to a central control unit 122. By way of other connector leads, control unit 122 controls injector(s) 114 and spark plugs 120. In addition, the control unit carries out the method of the invention.

Figure 2:
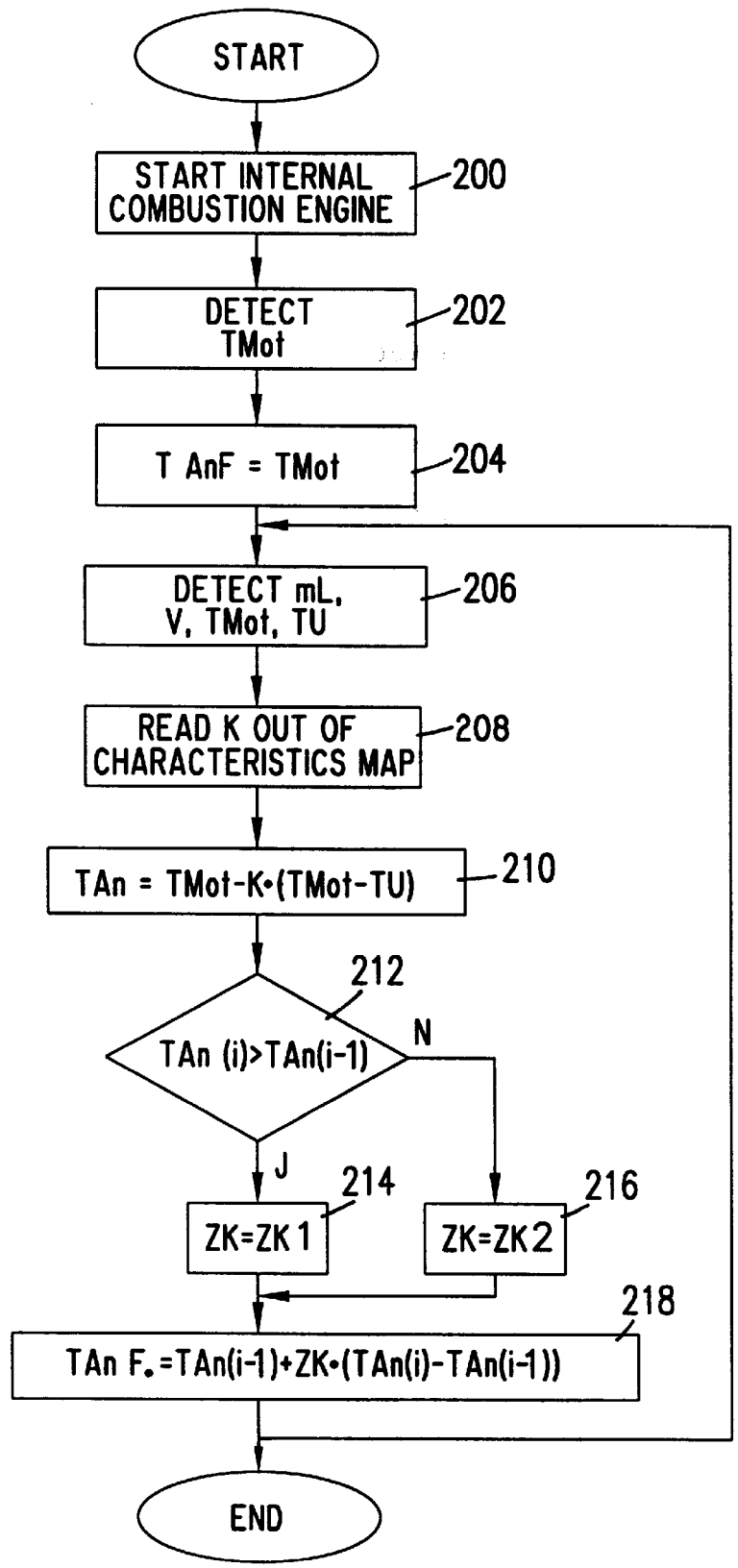
FIG. 2 depicts a flow chart for illustrating the method of the present invention.

FIG. 2 shows a flow chart for illustrating the method of the invention. In a first step 200, internal combustion engine 100 is started. Step 200 is followed by a step 202, in which the temperature of internal combustion engine look is detected and is held ready as a signal TMot. Step 202 is followed by a step 204, in which a signal TAnF, which represents a filtered value of the induction air temperature, is set to a value indicating the signal TMot for the temperature of internal combustion engine 100. Step 204 is used for initialization purposes and, as a rule, is performed only once immediately after internal combustion engine 100 is started. After that, signal TAnF is determined in accordance with the method described in the following.

Step 204 is followed by a step 206, in which a number of operating parameters are determined which are required for generating the filtered signal TAnF for the temperature of the induction air of internal combustion engine 100. In particular, of signal mL for the induction air quantity or air mass of internal combustion engine 100, signal v for vehicular speed, signal TMot for the temperature of internal combustion engine 100, and signal TU for the ambient temperature are detected. Signal mL can be generated by the air-flow sensor or mass air-flow sensor 106 or be determined from the signal P of pressure sensor 112 and from signal n of engine speed sensor 116. Step 206 is followed by a step 208. In step 208, a correction factor K is read out of a characteristics map which is set up to include the induction air mass or air quantity mL and the vehicular speed v. Instead of this characteristics map, a characteristic curve can also be used, which is stored as a function of the air quantity or air mass mL (i.e., correction factor K can also be solely a function of air quantity or air mass mL). Step 208 is followed by a step 210, in which a signal TAn for the temperature of the induction air of internal combustion engine 100 is determined from signals TMot and TU determined in step 206 and from correction factor K determined in step 208. The correction factor K is multiplied by the difference of signals TMot and TU representing the engine temperature and the ambient temperature respectively. This multiplication product is subtracted from signal TMot for the engine temperature and, in this manner, a value is determined for lagging of signal TAn.

To allow for the induction air temperature, with a certain inertia, behind a rapid change in the operating conditions, and since intake tract 102 acts as a heat accumulator, signal TAn for the induction air temperature is filtered. The filtering can take place for rising and falling induction air temperature with different time constants ZK1 and ZK2. In particular, the following steps are carried out in connection with the filtering process:

Query 212 following step 210 questions whether the value TAn(I) of the induction air temperature is greater than the preceding value TAn (I-1). If this is the case, then the temperature of the induction air rises and query 212 is followed by a step 214, where value ZK1 is assigned to time constant ZK. If, on the other hand, query 212 is not satisfied, i.e., the temperature of the induction air drops, then query 212 is followed by a step 216, where a value ZK2 is assigned to the time constant ZK. Both step 214 as well as step 216 are followed by a step 218. In step 218, a filtered signal TAnF is determined for the temperature of the induction air. For that, the temperature of two sequential values TAn (I) and TAn (I-1) of the induction air temperature are multiplied by time constant ZK. This multiplication product is added to the value TAn (I-1) for the induction air temperature. The filtered signal TAnF for the induction air temperature can then be fed to the desired applications. It can be used, for example, to correct the signal P for the pressure prevailing in the intake tract or signal mL for the induction air quantity or air mass. The cycle through the flow chart ends with step 218 and begins again with step 206.

FIG. 3 shows one possible calculation for the characteristics map for determining correction factor K, which is set up to include the signals v for the vehicular speed and mL for the induction air quantity or air mass of internal combustion engine 100. At a very low vehicular speed (e.g., when the vehicle is at a standstill), and at a very low induction air quantity or air mass (e.g., when the vehicle is idling), the correction factor K has the value 0. Thus, the calculation performed in step 210 of FIG. 2 leads to signal TAn for the temperature of the induction air being equal to the signal TMot for the temperature of internal combustion engine 100. In another extreme case, at a very high vehicular speed and a very high induction air quantity or air mass, the correction factor K has the value 1. Therefore, the calculation in accordance with step 210 of FIG. 2 leads to the signal TAn for the induction air temperature being equal to the signal TU for the ambient temperature. Thus, the induction air temperature varies between the temperature of internal combustion engine 100 and the ambient temperature depending on how quickly the vehicle is moving and which air quantity or air mass is drawn in by the internal combustion engine.

What is claimed is:

1. A method for generating an induction air temperature signal, comprising the steps of:

providing a temperature signal indicative of a temperature of an internal combustion engine;

providing an ambient air temperature signal; and generating the induction air temperature signal as a function of the engine temperature signal and the ambient air temperature signal.

2. The method according to claim 1, further comprising the steps of:

determining a vehicular speed signal;

determining an induction air signal; and determining a correction factor as a function of at least one of the vehicular speed signal and the induction air signal;

wherein the induction air temperature signal is generated as a further function of the correction factor.

3. The method according to claim 2, wherein the induction air signal represents an induction air mass.

4. The method according to claim 2, wherein the induction air signal represents an induction air quantity.

5. The method according to claim 2, wherein the generating step includes the steps of:

obtaining a difference value of the engine temperature signal and the ambient air temperature signal;

obtaining a multiplication product by multiplying the correction factor by the difference value; and subtracting the multiplication product from the engine temperature signal.

6. The method according to claim 1, further comprising the step of filtering the induction air temperature signal.

7. The method according to claim 6, wherein the induction air temperature signal is filtered using a time constant dependent on whether the induction air temperature signal is rising or falling.

8. A device for generating an induction air temperature signal, comprising:

means for providing a temperature signal indicative of a temperature of an internal combustion engine;

means for providing an ambient air temperature signal; and means for generating the induction air temperature signal as a function of the engine temperature signal and the ambient air temperature signal.

* * * * *

UNITED STATES PATENT AND TRADEMARK OFFICE
CERTIFICATE OF CORRECTION

PATENT NO. : 5,803,608

DATED : September 8, 1998

INVENTOR(S) : Helmut Randoll, Andreas Roth

It is certified that error appears in the above-identified patent and that said Letters Patent is hereby corrected as shown below:

Column 1, lines 34-35, delete "Advantageous embodiments of the method according to this following.";

Column 1, line 65, after "invention" delete "; and" and insert -- . --;

Column 2, line 9, "106 -for" should be --106 (for--;

Column 2, line 10, after "meter" insert -- ) --;

Column 2, line 12, after "least" delete " : ";

Column 2, line 34, "look" should be --100--;

Column 3, line 5, "for lagging of signal" should be --for signal--; and

Column 3, line 6, "for the" should be --for lagging of the--.

Signed and Sealed this

Tenth Day of August, 1999

Attest:

Q. TODD DICKINSON

*Attesting Officer*  *Acting Commissioner of Patents and Trademarks*